Feb. 4, 1947.     S. C. HURLEY, JR     2,415,177
APPARATUS FOR PHOTOELECTRIC CAMMING
Filed July 20, 1944     3 Sheets-Sheet 1

INVENTOR.
SAMUEL C. HURLEY JR.
BY Benedict & Sunderland
ATTORNEYS

Feb. 4, 1947.  S. C. HURLEY, JR  2,415,177
APPARATUS FOR PHOTOELECTRIC CAMMING
Filed July 20, 1944  3 Sheets-Sheet 3

INVENTOR.
SAMUEL C. HURLEY JR.
BY Benedict & Swartwood
ATTORNEYS

Patented Feb. 4, 1947

2,415,177

UNITED STATES PATENT OFFICE 2,415,177

APPARATUS FOR PHOTOELECTRIC CAMMING

Samuel C. Hurley, Jr., Danville, Ill.

Application July 20, 1944, Serial No. 545,872

6 Claims. (Cl. 88—14)

Broadly, this invention relates to an apparatus for the inspection of articles and objects by photoelectric means wherein at least two control grids in an electronic circuit are independently controlled by light sensitive circuits.

One object of my invention is to provide a novel apparatus for determining the size of an article by photoelectric camming. By photoelectric camming, I mean the passing of an article through an inspection zone, and, in effect, taking a picture of it. In place of mechanical reference points, I use light sensitive devices positioned to indicate when the article is in proper test position or when a portion of the article is in a predetermined position and making all other inspections from the photoelectric reference point.

Another object of my invention is to simultaneously determine the shape of the article at two or more points.

Another object of my invention is to simultaneously determine different inspections such as two different dimensional inspections.

Another object of the present invention is to provide an improved inspection mechanism which may operate upon specimens in motion without physical contact between the testing instrumentalities and the specimen.

Another object of the invention is to provide a phototube inspection device including a plurality of phototube bridges, all of which must be either balanced or all in unbalanced condition in order to operate an energizable mechanism.

Another object of the invention is to provide in the photoelectric camming device, positive actuation of the energizable mechanism so that a failure of component parts of the device will not actuate the energizable mechanism or the energy translation means. This is accomplished when the phototube bridge circuits are in unbalanced condition. A further object of the invention when used for checking articles for size is to provide an improved sizing device having a plurality of phototubes in which the relative positions of the various phototubes and other elements of the device may be varied to vary the tolerance permitted.

The principal application of my device is to inspect objects, articles, or specimens while in motion, although other applications may be made of my device. Among the uses for my photoelectric camming device are the following:

1. Measuring sizes of articles. This is accomplished by photoelectric camming of the two edges of the article; and by using a calibrated indicating device in connection with the energizing means, the size of the article can be determined.

2. Checking of articles or specimens such as sheets, boxes, rounds, etc., for proper size.

3. Measuring or indicating distance between two points.

4. To operate a selecting or indicating mechanism when a predetermined position is reached.

5. Indicating, measuring, identifying or sorting articles such as checks, time cards, etc., by determining the distance between spots or lines on said articles, or the relative positions of said spots or lines with reference to one another or to some reference point on the article.

6. To control and maintain the proper feeding of articles such as paper, tape, sheet steel, etc., into a mechanism wherein another operation takes place. A specific example of this is to control and maintain the feeding of paper into a printing press to maintain the paper in its proper relationship to the printing device. The device is particularly useful in this connection to control the relative position of the paper when color printing is used, since in color printing, the paper must be fed through the device several times, once for each color.

7. To line up articles in trimming operations such as the trimming of wood, paper, steel, books, tape, etc.

8. To control and maintain the position of articles in die-stamping, printing, cutting, trimming, etc.

9. It may also be used to indicate photoelectrically when any article enters the inspection zone or is in position in the testing zone in any inspection operation such as when one edge of an article first enters an inspection zone it would affect a light sensitive circuit which would control a control grid in an electronic circuit.

10. It is also applicable in inspection operations of the type where it is desired to measure or indicate the bevel or angle of an article particularly in case of a round.

11. It is also useful in determining the shape of articles.

12. To determine, inspect, or indicate simultaneously two different dimensions of an article.

My invention relates particularly to an electronic circuit capable of conducting an electric current only when the control grids, controlled either directly or indirectly by independent and separate light sensitive circuits but in all cases, responsive to the state of illumination of the light sensitive circuits, are simultaneously driven in a positive direction in respect to the potential of their respective cathodes and in which circuit the current flow is reduced or stopped, by driving the potential of either of the control grids in a negative direction. Whether or not the current flow is reduced or stopped as above described depends on the state of illumination of the light sensitive devices. In other words, the bias on each of the control electrodes must be positive in respect to their cathodes at any given instant to cause a flow of current through the electronic circuit but the bias on each can be independently and separately changed to reduce or stop the flow of current through the electronic circuit.

Throughout the specification, when I refer to a positive bias or to positive potential on the control grid with respect to the cathode is meant a bias at least of the proper potential to initiate conductance of a tube or render it conducting. Some tubes depending on their operating characteristics, will begin to conduct or will ionize when the potential of the control grid is slightly negative with respect to the cathode usually within about 5 volts.

My invention broadly relates to an inspection apparatus comprising an electronic circuit containing two control grids. The control grids may be in either the same electronic tube or two separate electronic tubes, both connected in the electronic circuit. The two or more control grids are controlled by independent and separate light sensitive circuits, each of which may comprise at least one light sensitive device, and the grids are responsive to the state of illumination of the light sensitive devices. The electronic circuit may be connected directly with a means for interpreting the results of the inspection or may actuate or control an independent control or indicating circuit.

In one specific embodiment illustrating one application of my invention, my device includes a plurality of phototube bridges, one responsive to the conditions of light and shadow due to one position of the article and another responsive to the conditions of light and shadow due to another predetermined position of the article, each bridge including a pair of phototubes forming arms of the bridge. If the specimen is in the proper predetermined position, one of the phototubes of each bridge is in shadow and the other phototube of each bridge is in light. The bridges are connected so as to be unbalanced under these conditions and an energizable mechanism is actuated through the electronic circuit. Although the above is the preferred arrangement of the bridges, it is within the scope of my invention to arrange the bridges so that when the bridges are in balanced condition, the device will then actuate the energizable mechanism. It is preferred to have the bridges connected to operate the energizable mechanism when they are both unbalanced in order that if anything goes wrong with the device, the energizable mechanism will not be actuated. In this method of using the bridges, if either of the bridges is in balance, that is to say, if the phototubes of either bridge are both in light or both in shadow, the energizable mechanism is not actuated.

Other objects, advantages and applications of my invention will become apparent by referring to the drawings in which.

It should be understood that the drawings illustrated are not to be limiting to my invention nor are the different modifications and embodiments to be considered equivalent but are given to illustrate the principles of my invention.

Figure 1:
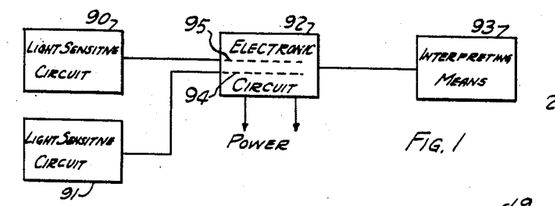
Fig. 1 is a diagrammatic drawing illustrating the broad principle of my invention.

Referring to Fig. 1, the light sensitive circuits 90 and 91 are shown for controlling control grids 94 and 95 in the electronic circuit 92 to which may be connected an interpreting means 93. The light sensitive circuits 90 and 91 comprise at least one light sensitive device such as a photoelectric tube, although other types of light sensitive devices may be used. The light sensitive devices in each of the light sensitive circuits may be, although not necessarily, connected in a bridge circuit for controlling the bias on the control grids 94 and 95. The light sensitive circuits may be used either to actuate the electronic circuit or deactuate it, depending upon the type of inspection desired. For example, the normal bias on the control grids 94 and 95 may be negative which prevents any current flowing through the electronic circuit. If the light sensitive devices have the proper state of illumination and are properly connected in the light sensitive circuits, they will place simultaneously a positive or conducting bias on the control grids 94 and 95, which will cause the current to flow through the electronic circuit 92. Similarly, if the bias on the control grids 94 and 95 is normally positive, as is the case when a current is flowing through the electronic circuit 92, one of the light sensitive circuits 90 or 91 may be used to place a negative bias on either of the control grids 94 and 95 and may thereby be used to deactuate the electronic circuit or to cause the flow of current through the electronic circuit to be discontinued.

In another example, the light sensitive circuit 91 might be normally used to maintain a positive bias on grid 94 which conforms to the normal condition during an inspection operation; whereas, a negative bias may normally be maintained on grid 95 and will only be changed when the light sensitive circuit 90 places upon the grid a positive bias, thus controlling the electronic circuit. The above examples are only a few of the various combinations that may be used within the scope of my invention, but are illustrative of the broad principles of my invention.

Any means for interpreting the results of the particular inspection operation may be used. In general, any device which indicates the state of illumination of the light sensitive devices connected in the light sensitive circuits may be used to indicate the results. For example, suitable indicating means may be embodied directly in the electronic circuit. In this case, lights, flags, bells, meters, recording meters, etc., may be used to indicate the state of illumination of the light sensitive devices which, in turn, interpret the results of the inspection. It is also within the scope of my invention to use an independent circuit which may be either a control circuit or an indicating circuit as an interpreting means for the results of the inspection. In this case, as will be described more specifically in connection with the other drawings, an energizable means such as a relay coil may be used to actuate a relay switch which will close the independent control or indicating circuit, thereby actuating it and indicating the results of the inspection.

Figure 2:
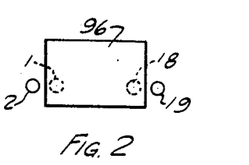
Figs. 2, 3, and 4 illustrate schematically several applications of the device shown in Fig. 1.

Fig. 2 illustrates diagrammatically one application of the broad principle illustrated in Fig. 1. In this case, the article to be inspected 96 may be measured for its length. Tubes 1 and 2 indicate when one edge of the article 96 is in a predetermined position and tubes 18 and 19 indicate when the other edge of the article is in a second predetermined position. When these two predetermined positions occur simultaneously, phototubes 1 and 18 are in shadow and phototubes 2 and 19 are in light. The light sensitive circuit embodying tubes 1 and 2 will control one control grid of an electronic circuit and the light sensitive circuit embodying tubes 19 and 18 will control a second control grid in the same electronic circuit. It should be noted that the control grids in my electronic circuit may be in separate amplifying or power tubes or may be embodied in the same power tube, although the two methods are not to be considered equivalent.

Figure 3:
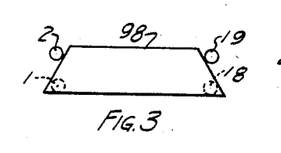

Fig. 3 shows one application for determining the shape of an article and illustrates particularly a use for determining the shape of a round. In Fig. 3, tubes 1 and 18 are in shadow, and tubes 2 and 19 are in light when the article has the proper slope or bevel.

Figure 4:
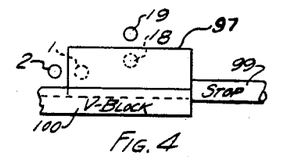

Fig. 4 illustrates one application for determining two different dimensions of an article. In this case, the article is located in the V block 100 against the stop 99. When the article 97 is in this position, two different dimensional determinations will be made simultaneously. Phototubes 1 and 2 may be used to indicate the length of the article and tubes 18 and 19 to indicate the diameter or width of the article.

Figures 5, 6:
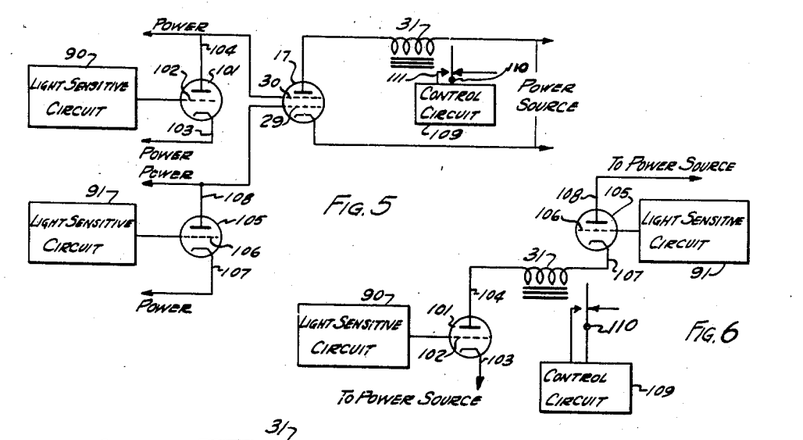
Fig. 5 illustrates a specific wiring diagram for carrying out the principles of my device shown in Fig. 1.
Figs. 6, 7, and 8 are additional modifications of the circuits that may be used in carrying out my invention.

Fig. 5 is similar to Fig. 1, but illustrates one specific use of only one power or amplifying tube such as tube 17 controlled by means of control grids 29 and 30. The light sensitive circuit 90 may control the flow of current in the tube 101 from its cathode circuit 103 to its plate circuit 104 by means of controlling the bias on the control grid 102. Similarly, the light sensitive circuit 91 may control the control grid 106 which, in turn, will control the flow of current through the tube 105 from the anode circuit 108 to its cathode circuit 107. The flow of current through the plate circuits of tubes 101 and 105 may be used independently to control the bias on the control grids 29 and 30 of tube 17 in a manner similar to the control of the bias on the control grids 94 and 95 in the circuit 92 of Figure 1 by circuits 90 and 91.

In Fig. 5, when a current flows through the tube 17, the energizable means illustrated as a relay coil 31 is energized and in turn, actuates the relay switch 110 and pulls the switch over to the contact 111 which closes the control or indicating circuit 109.

Fig. 6 illustrates another modification of the control of the control grids in an electronic circuit by means of two or more light sensitive circuits. In Fig. 6, the light sensitive circuit 90 controls the control grid 102 in amplifying tube 101 and the light sensitive circuit 91 controls the control grid 106 in the amplifying tube 105. When the bias on the control grids 102 and 106 is in positive direction compared to the respective cathodes of tubes 101 and 105, current will flow through the two amplifying or power tubes in series thereby energizing the relay coil 31 which, in turn actuates the control circuit 109.

Figure 7:
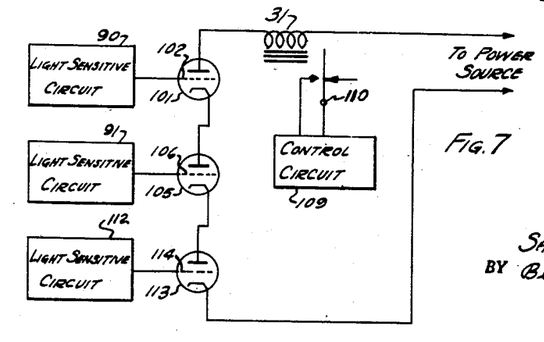

Fig. 7 illustrates the use of three amplifying tubes 101, 105, and 113 connected in series such that the bias on their respective control grids 102, 106 and 114 must be placed in a positive direction by their respective light sensitive circuits 90, 91, and 112 in order to complete the circuit to energize the relay coil 31, which, in turn, completes the control circuit 109. This circuit may be particularly useful in determining simultaneously three different inspections on an article or measuring two dimensions with photoelectric camming.

Figures 8, 9, 10, 11, 13:
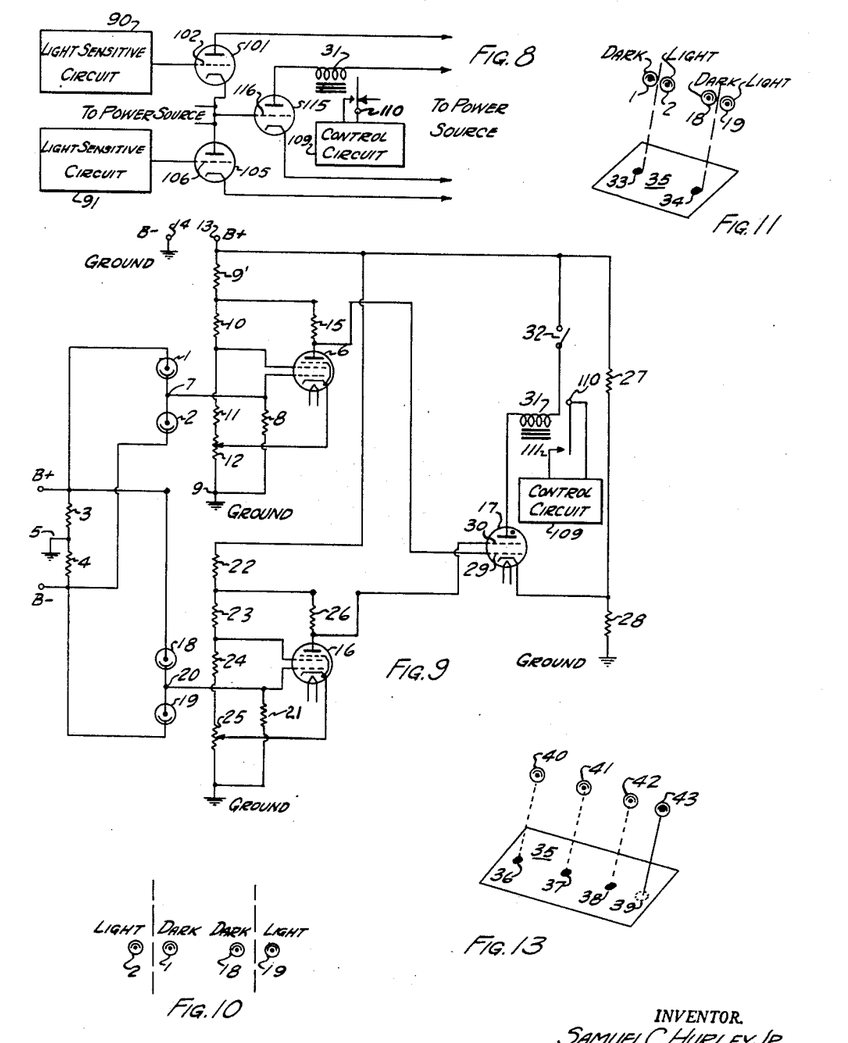
Fig. 9 is a detailed diagram showing a complete circuit for one embodiment of my invention.
Figs. 10 and 11 illustrate diagrammatically two applications for the device shown in Fig. 9.
Fig. 13 shows another application or use of the device shown in Fig. 12.

In Fig. 8, the light sensitive circuits 90 and 91 are used to control the bias on the grids 102, and 106 in the amplifying tubes 101 and 105, respectively, and by proper control of their bias, current can be made to flow through the tubes 101 and 105 connected in series and which current by suitable resistors (not shown) can be used to control the bias on grid 116 of tube 115, which, in turn, determines whether relay coil 31 is or is not energized.

Figs. 1 to 8 are given to illustrate several broad but not equivalent embodiments of my invention.

Fig. 9 shows a detailed and complete wiring circuit for one use for my invention and I have described Fig. 9 in connection with determining a dimension of an article by photoelectric camming, although the wiring diagram in Fig. 9 has many other uses.

Referring to Fig. 9, phototubes 1 and 2 are connected in a series across a source of D. C. potential. Resistors 3 and 4 are also connected across said source, these resistors being substantially equal, and the mid-point of the resistors is connected to ground 5. The control grid of a control or amplifying tube 6, which may be of the pentode type, is connected to the point 7 between phototubes 1 and 2. The point 7 is normally maintained at ground potential, by means of the resistor 8 which has a relatively high resistance and which causes relatively equal voltage drops in the phototubes 1 and 2, the resistor 8 being connected to ground at 9. It will be apparent that the point 7 and the control grid of the tube are at substantially ground potential when the phototubes 1 and 2 are non-conductive or when both are rendered conducting to approximately the same extent by an impingement of light thereon. That is, the bridge is in balance and no current flows across resistor 8. Thus, the resistors 3 and 4 and the phototubes 1 and 2 form the four arms of the bridge with the resistor 8 connected across the bridge at the junctions of the arms, remote from the junctions connected to the source of D. C. potential. The tube 6 may have its operating voltage obtained from a plurality of voltage dividing resistors 9', 10, 11 and 12 connected across the source of D. C. potential. The resistors 9', 10, 11, and 12 inclusive, provide proper operating voltages for the tube 6, the anode of this tube being furnished with a relatively high positive potential through the load resistor 15. The screen grid of the tube 6 is connected to a point of somewhat lower positive potential between the resistors 10 and 11. The cathode of the tube 6 may be connected to a variable slider, engaging the resistor 12 at a point which is at a sufficiently low positive potential above ground so as to place an effective negative bias on the control grid of tube 6 with respect to the cathode thereof. The bias placed on the control grid is preferably of such a relatively low negative potential, depending on the tube characteristics, as to permit tube 6 to conduct so that considerable current flows in the anode circuit of the tube 6. It will be apparent that this bias is not disturbed as long as phototubes 1 and 2 are non-conducting or conducting to a substantially equal extent, but that the bias on the control grid of the tube 6 will be changed if one of the phototubes 1 or 2 is subjected to light while the other remains in shadow.

The control tube 6, in conjunction with a similar control tube 16, is employed to control the action of power tube 17 which is preferably of the gas-filled, grid controlled arc discharge type. The control grid of the tube 16 is connected with respect to the phototubes 18 and 19 in a manner similar to the connection of the control grid of tube 6 with respect to tubes 1 and 2. Thus, the phototubes 18 and 19 are connected in a series across the resistors 3 and 4 so as to also form a bridge. The control grid of the tube 16 is connected to point 20 between the phototubes 18 and 19 and to ground through a resistor 21 having relatively high resistance so that the normal potential of the control grid of the tube 16 is substantially that of ground. The plurality of voltage dividing resistors 22, 23, 24, and 25 supply proper voltage to the electrodes of the tube 16 in a way similar to the voltage supply of the tube 6, the anode of the tube being connected to a relatively high positive potential through the load resistor 26.

The tube 17 may have its cathode connected to a relatively low positive potential maintained by the voltage dividing resistors 27 and 28 connected between the positive terminal 13 of a D. C. voltage source and ground. The potential of the cathode of the tube 17 is thus maintained positive with respect to the control electrode 29 of the tube 17 and also with respect to the screen electrode 30 of the tube 17 which normally has sufficient negative bias to maintain the tube 17 in non-conducting condition. An energizing mechanism such as a relay coil 31 may be used to energize a meter or indicator or a relay switch 110 as shown to actuate the control or indicating or interpreting circuit 109; the particular type of device actuated by energizing relay coil 31 depends upon the particular use to which my device is applied. The relay coil 31 is connected in series with a circuit breaking device such as a switch 32, although other well-known circuit breaking devices may be employed. The purpose of the circuit breaking device is to break the circuit and then close it again at the end of one inspection operation in order to deionize tube 17 and enable it, by the said closing of the switch, to be ionized, providing the proper potential is placed upon the control grids 30 and 29, as will be explained later. Other means for deionizing the tube may be used. One terminal of the circuit containing relay coil 31 and switch 32 is connected to the positive terminal 13 of the source of D. C. potential and the other terminal is connected to the anode of tube 17. Thus, when the tube 17 is in non-conducting condition or switch 32 is open, the coil 31 is not energized, but upon closing of the switch 32 and rendering the tube 17 conducting, provided the proper bias is on grids 29 and 30, the relay coil 31 is energized which attracts the armature of the relay switch 110, to open and close a circuit connected to suitable indicating or other mechanism. It has been found that the control electrode and shield electrode, 29 and 30 respectively, of certain types of gas filled tubes may be employed to control the ionization of the tube. I may use vacuum tubes or gas filled arc discharge tubes and with either type use more than two control grids in a single tube depending on the type of operation desired. That is, a sufficiently negative bias on either one of these electrodes will prevent ionization irrespective of whether the other electrode has a positive bias applied thereto with respect to the cathode. Preferably, a switch or other circuit breaking mechanism is closed just before the article reaches the desired test position so that the circuit through the tube 17 is conditioned for operation just prior to the article reaching the test position and the light beam shown in Figure 14, which causes either shadow or light to fall on phototubes 1, 2, 18, and 19, indicating whether or not an article is of the proper size. Relay coil 31, or other suitable energizing means is not energized unless the article is within the predetermined tolerance range; but if said article is within the predetermined tolerance range, relay coil 31 is energized, which in turn may actuate the indicating means. If the article is not within the tolerance range, the relay coil 31 is not energized upon closure of switch 32 because the proper positive potential has not been placed upon the control grids 29 and 30 thereby rendering the tube 17 conductive.

It will be noted that relay coil 31 is not energized unless the piece undergoing inspection is within the proper tolerance. The bias upon the control grids of the control tubes 6 and 16 is normally held at a sufficiently low negative potential by the connections shown, so that a substantial current flows in the anode circuit of these tubes when the bridges, including the phototubes 1 and 2, and the phototubes 18 and 19 are in balance. This current, flowing through the load resistors 15 and 26 and the tubes 6 and 16, respectively, maintains the control electrode 29 and the shield electrode 30 of tube 17 at a sufficiently high negative potential with respect to the cathode of tube 17 to prevent ionization of this tube even when switch 32 is closed. It should be noted that the switch 32 may be opened or closed either by hand or by connecting the switch to suitable controls. Thus, when both bridge circuits are balanced, closure of mechanical switch 32 will not cause current to flow in the anode circuit of tube 17; and will not, therefore, energize relay coil 31 because of the high negative potential on control grids 29 and 30. Referring to Fig. 10, the article to be tested may be passed through the beam of light and if it is of the proper size, it will darken tubes 1 and 18, tubes 2 and 19 remaining in light. Before the article enters the beam, both of the phototube bridges are in balance. When the article first enters the light beam, the leading edge of the article reaches a point in which the phototube 2 is placed in shadow, while the phototube 18 remains in the light. Even if the mechanical switch 32 were closed at this point, no ionization of the tube 17 would take place as placing the phototube 2 in shadow so that the control grid of the tube 6 is driven in a positive direction increasing the negative bias on the control grid 29 of the tube 17. As the article progresses further into the light beam, both phototubes 1 and 2, are placed in shadow so that the bridge containing these tubes is driven in a positive direction still maintaining the bias on the control grid 29 of tube 17 at a negative potential. During this time, the phototubes 18 and 19 remain in light so that the bridge containing these tubes remains balanced, thus maintaining the negative potential upon the shield electrode 30 of the tube 17.

As the article progresses through the light beam, it reaches a point at which the phototube 18 is placed in shadow, while the phototube 19 remains in light. This unbalances the bridge containing the phototubes 18 and 19 to drive the control grid of the tube 16 in a negative direction to decrease the anode current through the tube 16. This reduces the drop through the load resistor 26 of this tube and allows the shield grid 30 of the tube 17 to become positive or at least be carried in a positive direction in respect to the cathode of this tube so that the control grid 29 of the tube is conditioned for causing ionization of the tube.

If the article is larger than the predetermined size, both phototubes 1 and 2 remain in shadow so that this bridge remains balanced and the control grid 29 of tube 17 remains negative. At this time, the mechanical switch 32 has been closed but the relay coil is not energized because the tube 17 remains non-conducting.

If the article is within the predetermined tolerance range, the phototube 1 is placed in shadow while phototube 2 is in the light and it will be remembered that the article is in such a position that phototube 18 is placed in shadow while phototube 19 is in light. This unbalances both phototube bridges so that both the control electrode 29 of the tube 17 and the shield electrode 30 are carried in positive directions. Thus, with the mechanical switch 32 closed, the tube 17 ionizes and the relay coil, or energizing mechanism 31 is energized.

If, however, the article is too small, both phototubes 1 and 2 are in the light when the leading edge of the article reaches a position such that phototube 18 is in shadow and phototube 19 is in light, so that the control electrode 29 of the tube 17 is maintained negative when the shield electrode 30 thereof is carried in a positive direction. The tube 17 does not ionize even though the switch 32 is closed, which prevents energizing means or relay coil 31 from being energized, indicating that the piece is bad.

Fig. 10 illustrates not only the testing of an article for a predetermined size, but also a method for positioning a sheet or controlling a sheet in feeding it to another operation such as a printing or trimming operation.

It will be apparent from the above description of the operation that the only condition under which the relay coil 31 is energized is that the article be of the correct size to place phototube 18 in shadow when phototube 19 is in light, while, at the same time, placing phototube 1 in shadow while phototube 2 is in the light. This means that the article must be within the predetermined tolerance and properly positioned in the light beam. It should be noted that it is merely necessary that the switch 32 be opened some time between test operations in order to deionize the tube 17.

Fig. 11 indicates another use of my invention utilizing the wiring diagram and circuits shown in Fig. 1. It may be used for identifying or sorting checks in the following manner: A suitable light beam may be projected upon the check, time card or other article 35 to be identified. Such article contains dots, spots, or lines properly spaced on the paper which will not reflect light to any great extent when the concentrated light beam is projected on dots 33 and 34, respectively. When the check or any other article of the kind is in the position shown, phototube 1 is relatively dark, 2 is in light, 18 is relatively dark, and 19 is in light. Thus, when the dots are placed on the paper and in proper relation to the light beam and four phototubes, the two bridge circuits containing the phototubes are unbalanced causing the tube 17 to conduct which operates relay 31, indicating this relationship of the dots, thus identifying the article. It will be apparent that reflected light used in the manner shown in Fig. 11 has a wide variety of uses. It is also within the scope of this invention to have a modification of Fig. 11 in which one pair of the phototubes would indicate one edge of the paper 35 as shown in Fig. 3, and another pair of phototubes would indicate the position of a dot, hole, notch, slot or the like. Other modifications are possible with my invention but are not illustrated, since the principle of my invention is described in connection with Fig. 9.

Although Fig. 9 illustrates the use of only 4 tubes for indicating the relative position of an object, any number of phototubes can be used for indicating different positions of the same article or different points on the same article by use of either additional control electrodes in the tube 17 or my connecting the desired number of amplifying tubes 17 in series, all of which must simultaneously conduct for indicating the desired result or they may be separately connected for controlling dependent relay coils or energizing means 3. All combinations of this type while not equivalent are within the scope of my invention.

Figure 12:
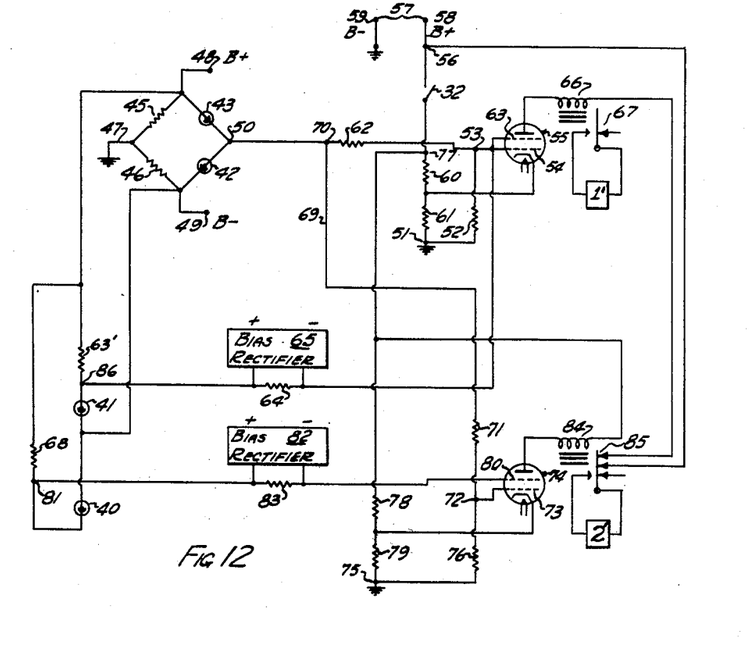
Fig. 12 is a complete diagram for one method of determining different size articles.

Fig. 12 illustrates another modification of my invention. It is particularly applicable for determining the proper size of articles such as in the measurement of different size sausage casings, and the like where close tolerances are not required. It is also applicable to a device for sorting checks, invoices, etc., wherein it is only necessary to identify the particular item. In general, Fig. 12 uses two phototubes to indicate the reference point and uses individual phototubes to indicate any desired number of other points.

Referring to Fig. 12, normally, phototubes 42, 43, 41, and 40 are in light. When the piece or object is properly positioned as indicated by photoelectric camming, tube 43 is in light and 42 is darkened, and if the piece is of a certain predetermined dimension, it will also darken tube 41, operating indicating, selecting, or identifying mechanism 1'. If the piece is at the next predetermined position or is of the next size or the identification medium is in the next position, tube 43 again is in light, tube 42 in darkness, which indicates the piece or object is in proper inspection position and tube 40 is now dark, which actuates indication, or inspection or identification device 2', as will be hereinafter described.

Referring to Fig. 13, in check sorting and similar sorting devices the paper 35 is marked with the proper coding of dots. Tubes 42 and 43 indicate the reference points by the use of reflected light, or a light may be projected along the edge of the paper such that a shadow falls between a pair of phototubes thereby using the edge as a reference point. If the paper 35 is coded with dot 37 when the paper is in proper position, provided the phototube 41 is properly placed, phototube 41 will become darkened by the dot due to the decrease of reflected light which will cause indicator 1' to be actuated. If the paper 35 is coded with dot 36, when the paper is properly positioned, dot 36 will darken tube 40 which will actuate indicator 2'. Thus, this device can be used for identification of articles as well as selecting articles for size or determining the dimension of articles.

Referring to Fig. 12, phototubes 42 and 43, and resistors 45 and 46 form the four arms of a Wheatstone bridge grounded at 47. The bridge is connected to a source of D. C. potential, with its positive terminal at 48 and its negative terminal at 49. Point 47 is connected to point 50 by connecting the ground 51 through resistor 52 to point 53, which is connected to the control grid 54 of tube 55. Tube 55 is preferably of the gas-filled type and has its anode circuit connected to the source of potential at point 56, which is connected to the positive terminal of battery 57 at point 58, said battery having its negative terminal connected to the ground at point 59. The tube 55 is provided with proper operating current by connecting the D. C. source of potential from the positive terminal 58 to the ground 51 and has its operating voltages properly provided by dividing resistors 60 and 61. The cathode of tube 55 is connected between dividing resistors 60 and 61 to provide sufficiently high positive potential compared with the potential of control grid 54, so that normally tube 55 is unable to ionize. When the bridge, including phototubes 42 and 43, is in balance, that is both tubes light or both tubes dark, the control grid 54 connected through resistor 62 to point 50 is at substantially ground potential, whereas the cathode is at a relatively high positive potential and the tube 55 will not ionize which means that no current will flow through its anode circuit.

When the bridge above described is out of balance, that is when tube 43 is light and tube 42 is darkened, a relatively high positive potential is placed on the control grid 54, which places the tube in readiness for ionization, when the screen grid 63 is also placed at a high positive potential, as will be hereinafter described. Phototube 41 and resistor 63', together with resistors 45 and 46, form another bridge grounded at point 47 and connected across a source of D. C. potential between points 48 and 49. When tube 41 is light, a relatively high negative potential is placed across the loading resistor 63', across the resistor 64, and places a negative potential on the screen grid 63 of tube 55, which prevents that tube from ionizing even though the proper positive potential has already been placed on control grid 54 due to the fact that the bridge including the tubes 42 and 43 is unbalanced. Ordinarily, a sufficiently high negative potential is placed on the screen grid 63 when tube 41 is light, depending upon the amount of light on tube 41. However, if the light on tube 41 is insufficient for this purpose bias rectifier 65 is connected in parallel with resistor 64 to provide sufficient negative bias on the screen grid 63, thus preventing ionization of tube 55.

When tube 41 is darkened, indicating that the identification point for that size object is at that particular point, a high positive potential is placed on the screen grid 63 of tube 55; and, as heretofore described, if the piece is in its proper position, the bridge, including tubes 42 and 43, is unbalanced causing a high positive potential on grid 54 of tube 55, and tube 55 will ionize which results in current flowing through the anode circuit. The current flowing through the anode circuit energizes the relay coil 66 which actuates the indicator 1'. The power leads for indicator 1' are conventional and are not illustrated. While the drawings illustrate indicator 1', the relay coil 66 in connection with relay switch 67 can be used to actuate other devices such as a selecting mechanism to accept or reject the article, and by proper correlation can be used to indicate the size of the article; it can also be used to indicate the position of a coded mark on articles to be sorted, such as checks, or used for other identifying purposes. The indicator can also be a light, a bell, a flag, an A. C. recording meter, etc. Furthermore, the indicating or identifying means may be connected directly in the anode circuit of tube 55. When the apparatus of Figure 12 is used to indicate different sized articles, indicator 2' for example, indicates a certain size and when tube 40 is darkened, indicator 2' is actuated informing the operator that the next predetermined size has been reached.

Tube 40 and resistors 68, 45 and 46 form a third bridge. Line 69 connected between point 70 and ground 75 in effect connects point 70 to point 47 on the other side of the bridge. Line 69 contains resistor 71 and the point 72 in the line 69 is connected to the control grid 73 in tube 74. The control grid 73 is also connected to the ground 75 through the resistor 76.

The tube 74 is connected across a D. C. potential from point 77 through voltage dividing resistors 78 and 79 to the ground 75, this circuit providing the operating voltages for the tube 74. The screen grid 80 of tube 74 is connected to the point 81 of the bridge, including tube 40 and resistor 68. When the bridge is in balance, a relatively high negative potential relative to the cathode is placed on the screen grid 80 of tube 74 which prevents the tube from ionizing. The bias rectifier 82, connected in parallel with resistor 83, is provided for the same purpose in this circuit as bias rectifier 65 heretofore described.

When the bridge, including tube 40 and resistor 68 has tube 40 in shadow, a high positive potential is placed on the screen grid 80 of tube 74, which permits this tube to ionize, causing a current to flow in its anode circuit, providing a proper positive potential is maintained on control grid 73. Control grid 73 is connected at point 70 to the bridge containing tubes 43 and 42. When the article is in its proper position, this bridge is unbalanced, which places a high positive potential on the control grid 73; and since the screen grid 80 is already at a high positive potential, the tube 74 will ionize, actuating relay coil 84, causing the relay switch 85 to close, completing the circuit for indicator 2', which will indicate to the operator that the next sized article is in the testing zone. Relay switch 85 also closes the anode circuit of the tube 55 when the switch is in the position indicated in the drawings, that is, when relay coil 84 is not energized. When relay switch 85 is actuated, it breaks the anode circuit for the tube 55, which cuts out the indicator 1' leaving indicator 2' in position. Other means for actuating only one indicator at a time may be used.

Tubes 55 and 74 will continue to ionize regardless of the negative potential placed on the control grids if connected to a D. C. potential. It is therefore necessary to provide a switch 32 as a circuit breaker in the source of D. C. potential 57 in order that this switch may be opened prior to the next inspection which deionizes the tubes, and when the switch is again closed, the tubes are again ready for the next inspection. This switch may be either manually operated or may be operated with a cam synchronized with a feeding mechanism or otherwise controlled to accomplish the above purpose.

The above description of Fig. 12 shows a modification of my broad principle of photoelectric camming, but still maintains the features of my invention which is the use of two or more light sensitive circuits to independently control the control grids energizing devices such as the relay coils 66 and 84. Throughout the description of the drawings the same numbers for comparable parts have been used.

Figure 14:
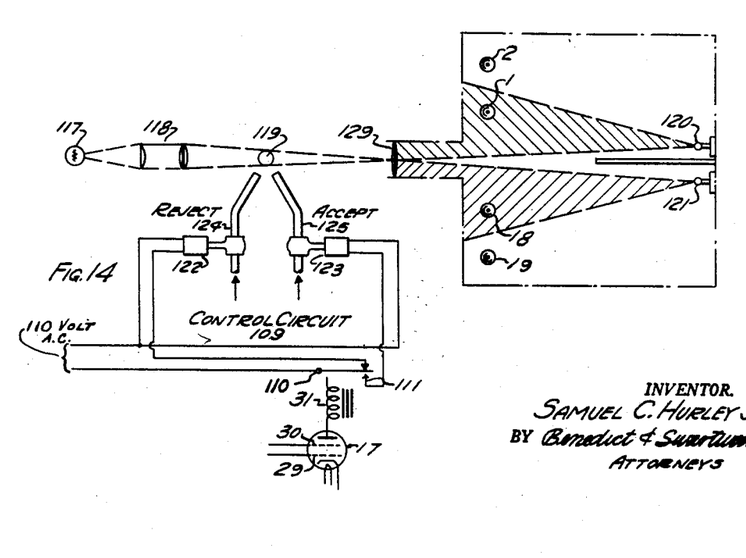
Fig. 14 shows a typical optical system and a typical wiring diagram for the control circuit which may be used in any of the modifications of my invention.

Fig. 14 illustrates a typical optical system which may be used in any one of the operations previously described. For the sake of illustration, I have discussed Fig. 14 in connection with the operation described for Fig. 9. The article to be inspected 119, may be a round and it may be desired to check its diameter. As a suitable light source, 117 is shown as an incandescent lamp, although other suitable light sources may be used, and is located on the optical axis of a pair of condenser lenses 118 which project a beam of light on both sides of the article 119. The beam of light passes through the projection lenses 129 onto mirrors 120 and 121. These mirrors are shown as convex cylinders, although other types of mirrors such as plano-convex, concavo-convex, etc., may be used. The lower image of article 119 is magnified by mirror 120 and is cast upon the light sensitive devices such as phototubes 1 and 2. Similarly, magnifying mirror 121 casts an image upon the light sensitive devices 18 and 19. If the article is of proper diameter, tubes 1 and 18 will be in shadow and tubes 2 and 19 will be in light. When this occurs, if the tubes are connected to a circuit similar to that shown in Fig. 9, or any other appropriate circuit, a current will flow through the amplifying or power tube 17, the relay coil 31 will be energized, and the control circuit 109 will be closed. When the control circuit is closed in that manner, it may close a circuit which will operate a solenoid valve 123 which will, in turn, act upon an air jet in line 125, which will pass the article to the accept receptacle. If either of the tubes 1 and 18 is in light or either of the tubes 2 and 19 is in shadow, the energizing or relay coil 31 will not be energized and the relay switch 110 will remain in the position which closes the circuit rejecting the article, in which case the solenoid valve 122 is actuated causing a stream of gas to pass through the line 124 which passes the article to the reject receptacle. The control circuit 109, illustrated in Fig. 14, is only one typical illustration that is of the type that may be used.

The drawings and above description thereof are illustrative of the principles of my invention, and are not to be considered limitations since my invention is limited only by the following claims.

I claim as my invention:

1. An electronic device comprising an electronic tube having an anode circuit, a cathode circuit and a control grid, said control grid biased by a light sensitive circuit containing at least one photoelectric device, a second electronic tube having an anode circuit, a cathode circuit and a control grid, said last mentioned control grid biased by another and separate light sensitive circuit, a third electronic tube having an anode circuit, a cathode circuit and two control grids, each of said control grids being biased by being operatively and controllably connected to the anode circuits of the first and second electronic tubes respectively.

2. An inspection apparatus for inspecting articles comprising an indicating means, means defining an inspection zone, a light source, means for projecting a beam of light from said source onto an article positioned in said zone, electronic amplifying means having at least two independently controlled grids in a single electronic circuit, said grids being cooperatively arranged for joint control of the flow of current through said single electronic circuit, a photoelectric device electrically connected to each of said grids for controlling the bias on the grid in accordance with the condition of illumination of said device, one of said devices connected to one of said grids arranged in a predetermined position relative to said inspection zone such that when one portion of said article occupies a predetermined position said device is subjected to a predetermined condition of illumination, another of said photoelectric devices connected to another of said grids arranged in another predetermined position relative to said inspection zone such that when another portion of said article occupies another predetermined position said device is subjected to a predetermined condition of illumination, and means in said single circuit responsive to change in flow of current through said circuit for controlling said indicating means to determine if both of said portions of said article occupy predetermined positions.

3. The apparatus of claim 2 wherein said electronic amplifying means comprises a single electronic tube containing said two grids.

4. An apparatus for inspecting articles comprising an indicating means, electronic amplifying means having at least two independently controlled grids in a single electronic circuit, said control grids being cooperatively arranged for joint control of the flow of current through said single electronic circuit, means in said single circuit responsive to change in flow of current through said circuit for controlling said indicating means, a photoelectric device electrically connected to each of said grids for controlling the bias on the grid in accordance with the condition of illumination of said device, means defining an inspection zone, means for projecting a shadow of an article while in the inspection zone, said photoelectric devices being arranged in predetermined positions relative to a portion of the contour of the shadow projected when a standard article is in the inspection zone.

5. An inspection apparatus for dimensional inspection of articles comprising indicating means, electronic amplifying means having at least two independently controlled grids in a single electronic circuit, said control grids being cooperatively arranged for joint control of the flow of current through said single electronic circuit, means in said single circuit responsive to change in flow of current through said circuit for controlling said indicating means, a photoelectric device electrically connected to each of said grids for controlling the bias on the grid in accordance with the condition of illumination of the photoelectric device, means defining an inspection zone, a light source, means for projecting a beam of light from said source through said inspection zone, said photoelectric devices being arranged in predetermined positions relative to said inspection zone so as to be subjected to predetermined conditions of illumination when a standard article is in the inspection zone.

6. An apparatus for inspecting articles comprising an indicating means, an electronic circuit, said electronic circuit comprising an electronic tube having an anode circuit, a cathode circuit and a control grid, said control grid biased by a light sensitive circuit containing a photoelectric device, a second electronic tube having an anode circuit, a cathode circuit and a control grid, said last mentioned control grid biased by another and separate light sensitive circuit containing a photoelectric device, a third electronic tube having an anode circuit, a cathode circuit and two control grids, each of said control grids being biased by being operatively connected to the anode circuits of the first and second electronic tubes respectively, said latter two control grids being operatively arranged for joint control of the flow of current through said third electronic tube, means in the anode circuit of said third electronic tube responsive to change in the flow of current through said third electronic tube for controlling said indicating means, means defining an inspection zone, means for projecting a shadow of the article while in the inspection zone, and said photoelectric devices being arranged in predetermined positions relative to a portion of the contour of the shadow projected when a standard article is in the inspection zone.

SAMUEL C. HURLEY, Jr.

REFERENCES CITED

The following references are of record in the file of this patent:

UNITED STATES PATENTS

| Number | Name | Date |
|---|---|---|
| 2,085,671 | Powers | June 29, 1937 |
| 2,199,396 | Dubilier | May 7, 1940 |
| 2,372,162 | Ryan | Mar. 20, 1945 |
| 2,192,735 | Cockrell | Mar. 5, 1940 |
| 2,170,157 | Pray | Aug. 22, 1937 |
| 2,162,508 | Knowles | June 13, 1939 |
| 2,238,762 | Whitaker | Apr. 15, 1941 |
| 2,237,665 | Gullikson | Apr. 8, 1941 |
| 2,173,164 | Hansell | Sept. 19, 1939 |
| 1,972,682 | Fitzgerald | Sept. 4, 1934 |
| 2,033,645 | Parkhill | Mar. 10, 1936 |
| 2,188,159 | Rockwood | Jan. 23, 1940 |
| 2,014,174 | Francis | Sept. 10, 1935 |
| 2,171,969 | Balsley | Sept. 5, 1939 |